United States Patent
Haka (10) Patent No.: US 6,835,157 B2
(45) Date of Patent: Dec. 28, 2004

(54) APPARATUS FOR CONTROLLING A PLURALITY OF SYNCHRONIZERS IN A MANUAL PLANETARY TRANSMISSION

(75) Inventor: Raymond J. Haka, Brighton, MI (US)

(73) Assignee: General Motors Corporation, Detroit, MI (US)

( * ) Notice: Subject to any disclaimer, the term of this patent is extended or adjusted under 35 U.S.C. 154(b) by 0 days.

(21) Appl. No.: 10/443,451

(22) Filed: May 22, 2003

(65) Prior Publication Data

US 2004/0235607 A1 Nov. 25, 2004

(51) Int. Cl.[7] ............... F16H 3/44; F16H 59/00; F16H 61/00; F16H 63/00
(52) U.S. Cl. ............. 475/269; 475/303; 74/337.5
(58) Field of Search ................. 475/303, 270, 475/271, 275, 331; 74/335, 337.5, 473.36

(56) References Cited

U.S. PATENT DOCUMENTS

| | | | | |
|---|---|---|---|---|
| 3,837,237 A | * | 9/1974 | Rossler et al. ............ | 475/219 |
| 4,368,650 A | * | 1/1983 | Numazawa et al. ........ | 475/136 |
| 4,569,252 A | * | 2/1986 | Harper ..................... | 475/299 |
| 4,976,670 A | * | 12/1990 | Klemen .................... | 475/278 |
| 5,390,559 A | * | 2/1995 | Thomas et al. ............ | 74/325 |
| 5,740,695 A | * | 4/1998 | Janson ..................... | 74/337.5 |
| 6,669,596 B1 | * | 12/2003 | Sefcik ..................... | 475/278 |
| 2004/0023748 A1 | * | 2/2004 | Haka ....................... | 475/303 |
| 2004/0082428 A1 | * | 4/2004 | Benedict .................. | 475/296 |

FOREIGN PATENT DOCUMENTS

JP        2002347458 A  * 12/2002  ........ B60K/17/16

* cited by examiner

Primary Examiner—Tisha Lewis
(74) Attorney, Agent, or Firm—Leslie C. Hodges (57) ABSTRACT

A planetary transmission has a plurality of torque-transmitting synchronizer mechanisms that are controlled to engage and disengage positions. The control of the torque-transmitting synchronizer mechanisms is accomplished through a plurality of cam slots and control rods that are disposed between a control mechanism and each of the torque-transmitting synchronizers to enforce engagement and disengagement of the synchronizers.

7 Claims, 5 Drawing Sheets

APPARATUS FOR CONTROLLING A PLURALITY OF SYNCHRONIZERS IN A MANUAL PLANETARY TRANSMISSION

TECHNICAL FIELD

This invention relates to synchronizers for power transmissions and, more particularly, to synchronizer controls for multiple speed planetary transmissions.

BACKGROUND OF THE INVENTION

Manual transmissions have been employed in passenger vehicles and trucks for many years. Manual transmissions have a central shaft and a countershaft, as well as an input head gearset. A plurality of ratio gears disposed in meshing relationship are rotatably mounted on at least one of the main shaft or countershaft and connectible selectively and individually with the other of the two shafts through a synchronizer clutch.

As is well known, synchronizer clutches have blocker mechanisms, which permit synchronization of the input and output side of the synchronizer to be at a single speed prior to the shift being completed. The synchronizers have a collar or shift ring, which is manipulated by a shift fork. The fork is controlled by a rail, which is movable fore and aft relative to the vehicle by a shift lever. The transmission control has as many rails as is necessary to accommodate the synchronizers within the transmission. If three synchronizers are present, there will be three shift forks. Each of the rails includes a detent mechanism, which prevents movement of more than one shift rail at a time. Thus, each of the gears or synchronizers to be manipulated are operated in single fashion such that two synchronizers cannot be manipulated during one shift sequence. During the shift sequence, the outgoing synchronizer is moved to a neutral position prior to the oncoming synchronizer being moved to the operating position.

Planetary transmissions, on the other hand, employ fluid-operated torque-transmitting mechanisms such that the engagement of two or more operating control devices might be employed. In order to improve the efficiency of planetary transmissions, it is desirable and has been suggested that synchronizer-controlled torque-transmitting mechanisms be employed in the place of hydraulic devices. If the hydraulic device is removed, the high-pressure control pump is no longer needed to establish the engagement and disengagement of these devices such that a lower volume pump can be employed when the pump simply supplies lubricating fluid to the transmission in a manner similar to countershaft type manual transmissions.

SUMMARY OF THE INVENTION

It is an object of the present invention to provide an improved control mechanism for synchronizer torque-transmitting mechanisms used in planetary transmissions.

In one aspect of the present invention, a control member having a plurality of cam slots or spaces is employed to control the manipulation of synchronizer shift collars.

In another aspect of the present invention, the cam spaces are formed in a tubular member surrounding the planetary gearing and synchronizer torque-transmitting mechanisms of a power transmission.

In yet another aspect of the present invention, the tubular control member has an infinite radius thereby resembling a flat plate member.

In still another aspect of the present invention, the tubular control member is rotated to establish the desired selection and movement of the synchronizer torque-transmitting mechanisms.

In a further aspect of the present invention, the cam control mechanism is manipulated in an H-pattern by a conventional shift lever control.

DESCRIPTION OF THE EXEMPLARY EMBODIMENTS

Figure 1:
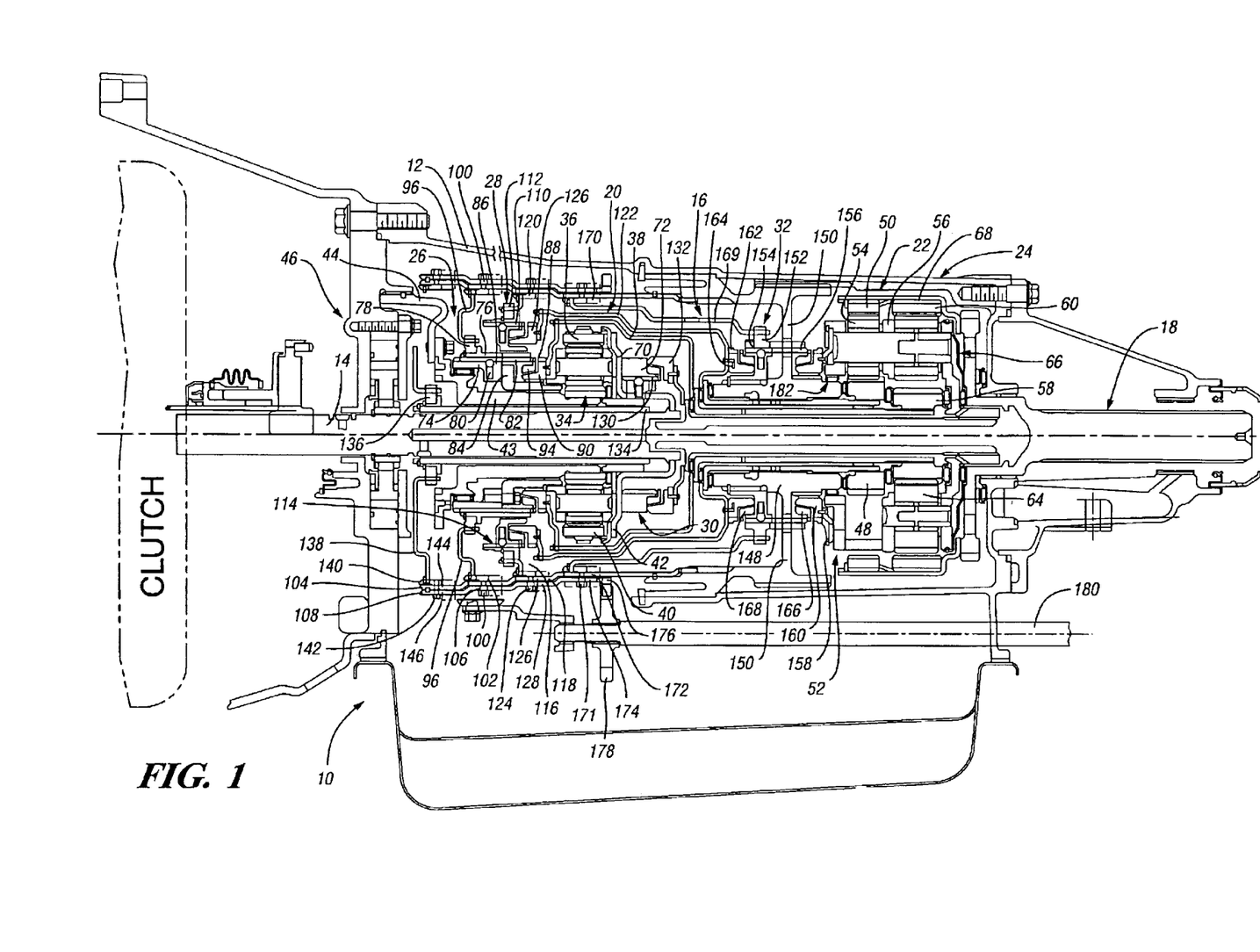
FIG. 1 is an elevational view of a power transmission incorporating the present invention.

Referring to the drawings, wherein like characters represent the same or corresponding parts throughout the several views, there is seen in FIG. 1 a power transmission 10 having a transmission housing 12, a transmission input shaft 14, a planetary transmission 16, and an output shaft 18. The input shaft 14 is connected with a conventional selectively engageable friction clutch, not shown. As is well known, the friction clutch will permit engagement and disengagement of the transmission input shaft with a prime mover such as an internal combustion engine. The planetary transmission 16 includes three planetary gearsets 20, 22 and 24, and four torque-transmitting synchronizer assemblies or mechanisms 26, 28, 30 and 32.

The planetary gearset 20 includes a sun gear member 34, a ring gear member 36, and a planet carrier assembly member 38. The planet carrier assembly member 38 includes a plurality of pinion gears 40 rotatably mounted on a planet carrier member 42 and disposed in meshing relationship with the sun gear member 34 and the ring gear member 36. The sun gear member 34 is continuously connected through a sleeve shaft and hub 43 with the transmission housing 12 through a plurality of webs 44. The webs 44 are splined to a pump housing assembly 46, which is secured with or otherwise integral with the transmission housing 12.

The planetary gearset 22 includes a sun gear member 48, a ring gear member 50, and a planet carrier assembly member 52. The planet carrier assembly member 52 includes a plurality of pinion gears 54 rotatably mounted on a planet carrier member 56 and disposed in meshing relationship with the sun gear member 48 and the ring gear member 50.

The planetary gearset 24 includes a sun gear member 58, a ring gear member 60, and a planet carrier assembly member 62. The planet carrier assembly member 62 includes a first plurality of pinion gears 64 meshing with a second plurality of pinion gears 66 both of which are rotatably mounted on the planet carrier member 56 and disposed in meshing relationship with the sun gear member 58 and the ring gear member 60, respectively. The ring gear members 50 and 60 are integrally continuously connected by a hub member 68, which is continuously connected with the output shaft 18.

The ring gear member 36 of planetary gearset 20 is continuously connected through a hub 70 with the input shaft 14. The hub 70 is also continuously connected with a central hub 72, which is a component of the torque-transmitting synchronizer 30.

The torque-transmitting synchronizer 26 includes a central portion 74, a shift sleeve 76, and a shift collar 78. The shift sleeve 76 is releasably held in a neutral position on the central member 74 through a conventional ball detent 80. The shift sleeve 76 is slidably disposed on the central portion 74 and has a plurality of splined fingers 82, which extend through a hub 84 formed on a central member 86 of the torque-transmitting synchronizer 28. The fingers 82 are adapted to mesh with a spline 88, which are formed on an output member 90. The output member 90 is drivingly connected through a hub 92 with the sun gear member 58.

Disposed between the shift sleeve 76 and the output member 90 is a blocker ring and clutch assembly 94, which operates in a conventional manner to enforce speed synchronization between the central portion 74 and the output member 90 when the shift sleeve 76 is moved rightward as viewed in FIG. 1. The shift collar 78 is rotatably disposed on the shift sleeve 76 and is connected through a plurality of radial arms 96 through a sleeve portion 98. The sleeve portion 98 is secured to a plurality of pins 100 that extend through slots axial 102 formed on a control hub or tube 104 and cam slots 106 formed on a cam hub or tube 108. The slots 106 are in a cam pattern while the slots 100 extend axially along the control hub 104.

The torque-transmitting synchronizer 28 includes the central member 86, a shift sleeve 110, and a shift collar 112. The shift sleeve 110 is releasably held in a neutral position as shown in FIG. 1 by a conventional ball detent 114. The shift collar 112 is rotatably disposed on the shift sleeve 110 and is operatively connected through a plurality of radial spokes 116 to a sleeve 118. The torque-transmitting synchronizer 28 has an output member 120, which is secured or otherwise drivingly connected through a hub 122 with the sun gear member 48. The sleeve 118 has secured thereto a plurality of pins 124 that are disposed in axial slots 126 formed in the control tube 104 and also disposed in cam slots 128 formed in the cam tube 108.

The torque-transmitting synchronizer 30 includes the central hub 72, an inner portion 130, and an output member 132. The inner portion 130 is drivingly connected through a sleeve 134 with a shift collar 136. The shift collar 136 is rotatably mounted on the sleeve 134 and connected through a plurality of radial spokes 138 with a hub 140. The hub 140 has secured thereto a plurality of pins 142 that are slidably disposed in axial slots 144 formed in the tube 104 and in cam slots 146 formed in the tube 108.

The torque-transmitting synchronizer 32 includes a central member 148, which is secured through a hub 150 with the transmission housing 12. Thus, the central portion 148 of torque-transmitting synchronizer 32 is stationary. The torque-transmitting synchronizer 32 also includes a shift collar 152, which is held in a neutral position by a conventional ball detent 154. The shift collar 152 includes a spline portion 156, which is engageable with a spline 158 formed on a first output member 160. The spline 156 also is engageable with a spline 162 formed on a second output member 164. Conventional blocker rings and cone clutches 166 and 168, respectively, are disposed between the shift collar 152 and the output members 160 and 164.

The output member 160 is continuously connected with the planet carrier member 56 of the planetary gearsets 22 and 24, the output member 164 is continuously connected with the hub 122, which is connected with the output member 120 of the torque-transmitting synchronizer 28 and also with the sun gear member 48 of the planetary gearset 22. The shift collar 152 is continuously connected through a hub 169 with a sleeve 170. The sleeve 170 has secured thereto a plurality of pins 171, which are slidably disposed in axial slots 172 formed in the tube 104 and cam slots 174 formed in the tube 108.

Figure 2:
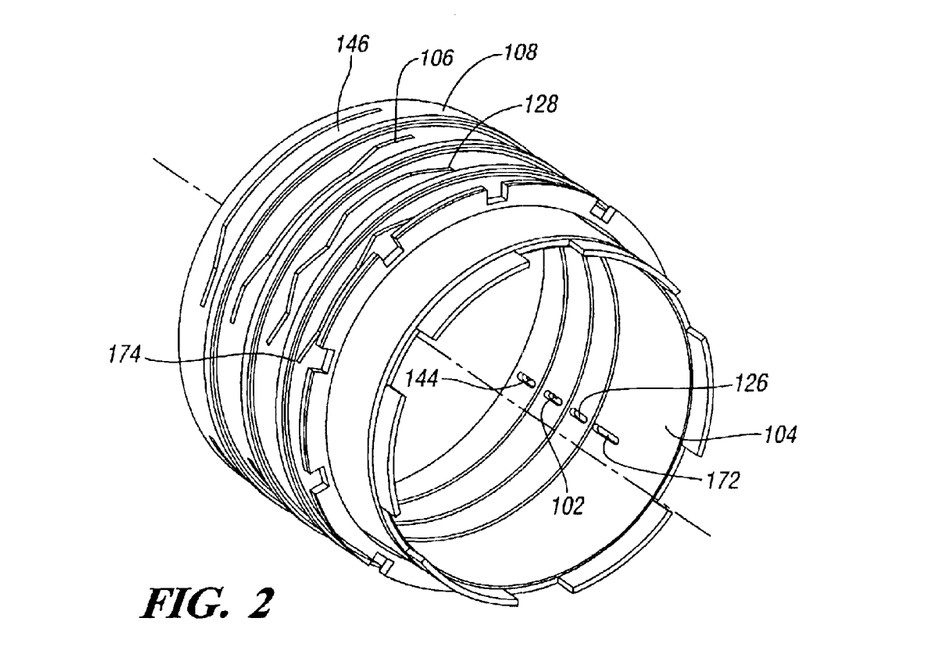
FIG. 2 is an isometric view of the cam slots employed in the transmission control of FIG. 1.

As seen in FIG. 2, the cam slots 106, 146, 128, and 174 are formed in three equiangular positions on the tube 108, while the axial slots 102, 126, 144, and 172 are formed in three equiangular positions on the tube 104. As previously described, the tube 104 is held stationary. This fixes the central position of the pins 100, 124, 142, and 171.

Figure 3:
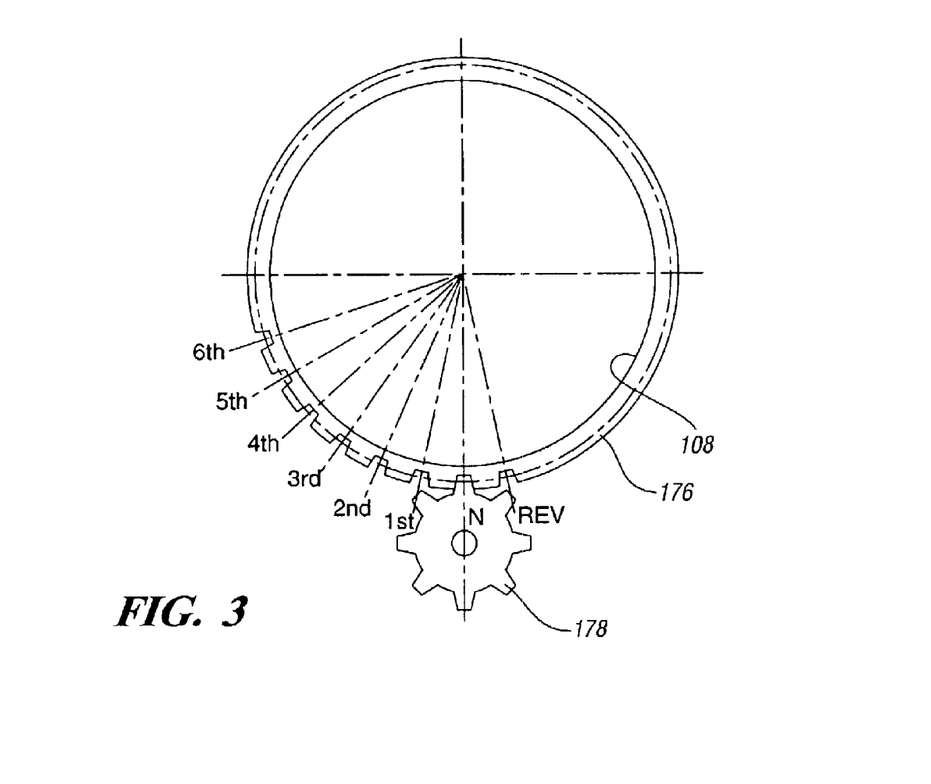
FIG. 3 is an elevational view describing the cam control system for rotating the cam mechanism of FIG. 1.

As seen in FIGS. 1 and 3, the hub or tube 108 has secured thereto a gear member 176. The gear member 176 meshes with a gear 178, which is rotatably secured with a shift control shaft 180. The shift control shaft 180 can be rotated by any common rotary means such as an electric motor or manually by the driver.

The gear 178 will rotate the tube 108 whenever the shaft 180 is rotated. As the shaft 180 is rotated and the tube 108 rotates therewith, the pins 100, 124, 142, and 171 will be manipulated in their respective slots to enforce movement of their respective shift sleeves. The tube 108 is shown in the neutral position in FIGS. 2 and 1. If the gear 178 is rotated counterclockwise in FIG. 3, the tube 108 will be rotated to the reverse position. When this occurs, the pins 124 and 171 will be moved axially towards the rear of the transmission.

The torque-transmitting synchronizer 32 will connect the planet carrier member 56 with ground and the torque-transmitting synchronizer 30 will connect the sun gear member 48 with the planet carrier member 42. The sun gear member 48 will be driven forwardly at a reduced ratio determined by the planetary gearset 20 and the ring gear member 50 and therefore output shaft 18 will be driven in reverse at a ratio determined by both the planetary gearset 20 and the planetary gearset 22.

When the gear member 178 is rotated clockwise one position from neutral, the pins 142, 124, and 171 will be in a neutral position and the pins 100 will be moved axially toward the rear of the transmission therefore causing the torque-transmitting synchronizer 26 to engage the planet carrier member 42 with the sun gear member 58. During the first forward speed ratio, synchronizer 32 will cause the planet carrier member 56 to remain stationary such that the ring gear member 60 and therefore output shaft 18 will rotate forwardly at a reduced ratio. To establish the second speed ratio, the gear 178 is rotated clockwise to the second notch from neutral The torque-transmitting synchronizer 26 will remain in the shifted position and the torque-transmitting synchronizer 32 will be moved to the forward position, thereby restraining the sun gear member 48.

To establish the third forward speed ratio, the gear 178 is moved to the third notch in the clockwise direction such that the torque-transmitting synchronizer 32 is moved through the neutral position, the torque-transmitting synchronizer is moved to the aft or driving condition, and the torque-transmitting synchronizer 26 remains in the driving condition. During the third forward speed ratio, the sun gear member 58 is driven by the planet carrier member 42 and the sun gear member 48 is also driven by the planet carrier member 42.

To establish the fourth forward speed ratio, the gear 178 is moved to the fourth clockwise position such that the torque-transmitting synchronizer 30 is shifted to an engaged condition, the torque-transmitting synchronizer 26 remains in the engaged condition, and the torque-transmitting synchronizer 28 is moved to the disengaged condition. Under this condition, the input shaft 14 drives the planet carrier member 56 through the torque-transmitting synchronizer 30 and the sun gear member 58 is driven by the planet carrier member 42 through the torque-transmitting synchronizer 26.

To establish the fifth forward speed ratio, the gear 178 is rotated clockwise to engage in the fifth clockwise slot. During the fifth forward speed ratio, the torque-transmitting synchronizer 26 is moved to the disengaged condition, the torque-transmitting synchronizer 28 is moved to the engaged condition, and the torque-transmitting synchronizer 30 remains in the engaged condition. In the fifth forward speed ratio, the sun gear member 48 is driven by the planet carrier member 42 through the torque-transmitting synchronizer 28 and the planet carrier member 50 is driven by the input shaft 14 through the torque-transmitting synchronizer 30.

To establish the sixth forward speed ratio, the gear 178 is rotated clockwise to engage the sixth clockwise slot on the gear member 176 secured to the hub 108. During the sixth forward speed ratio, the torque-transmitting synchronizer 32 is moved to the forward position thereby grounding the sun gear member 48, the torque-transmitting synchronizer 28 is moved to the disengaged condition, the torque-transmitting synchronizer 26 remains in the disengaged condition, and the torque-transmitting synchronizer 30 remains in the engaged condition. In the sixth forward speed ratio, the planet carrier member 56 is driven by the input shaft 14 through the torque-transmitting synchronizer 30 and the sun gear member 48 is held stationary by the torque-transmitting synchronizer 32.

The transmission can be stepped down through the gears by rotating the gear 178 in the opposite direction. The synchronizers can also be shifted from the first-to-third, or neutral-to second, or however the control wishes to rotate the gear 178. During each of the ratio interchanges, the selectively engageable friction clutch disposed between the input shaft 14 and the prime mover is disengaged while the synchronizers are manipulated.

Figure 4:
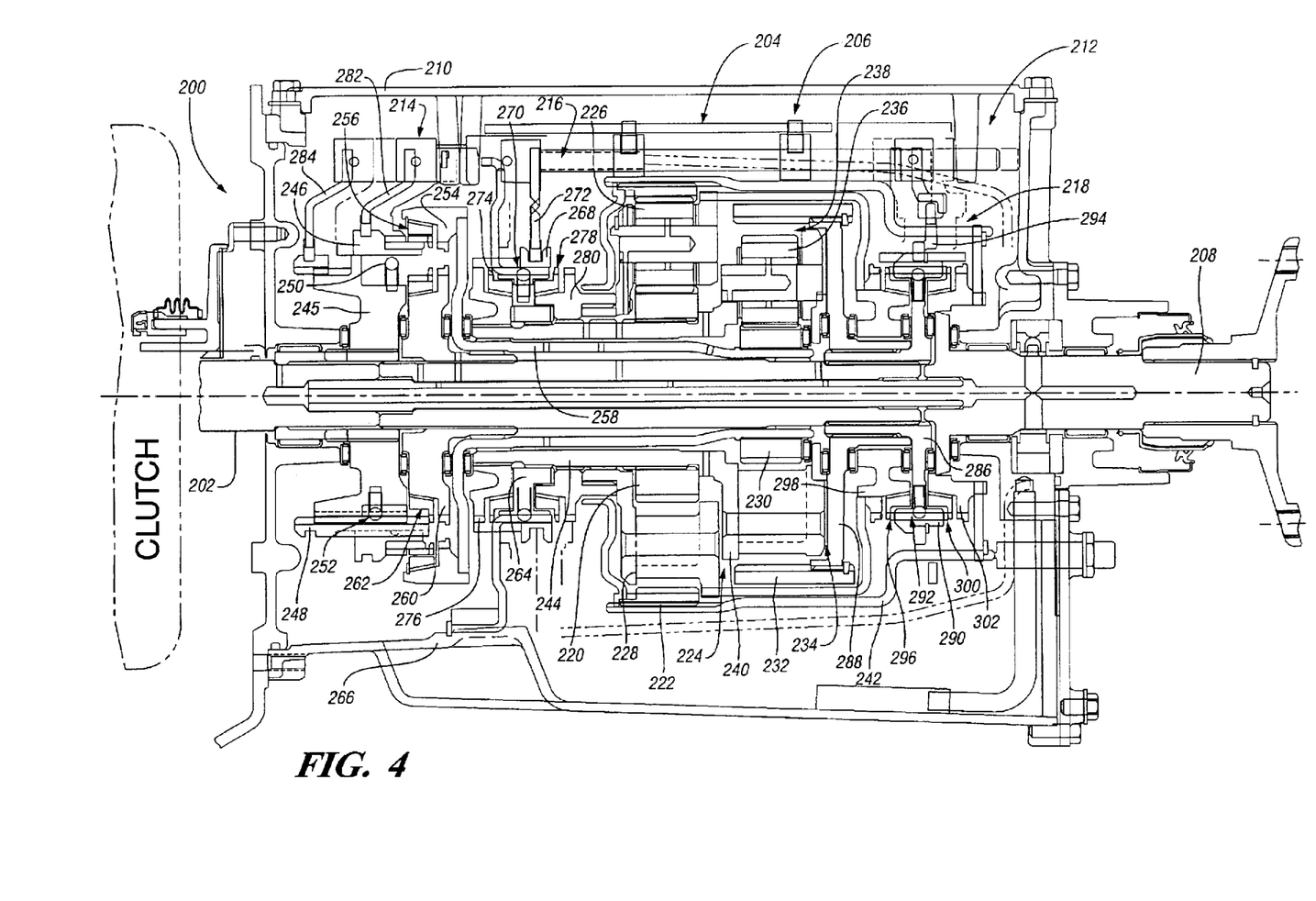
FIG. 4 is an elevational view of an alternate embodiment of the present invention described in a planetary manual transmission.
Figure 5:
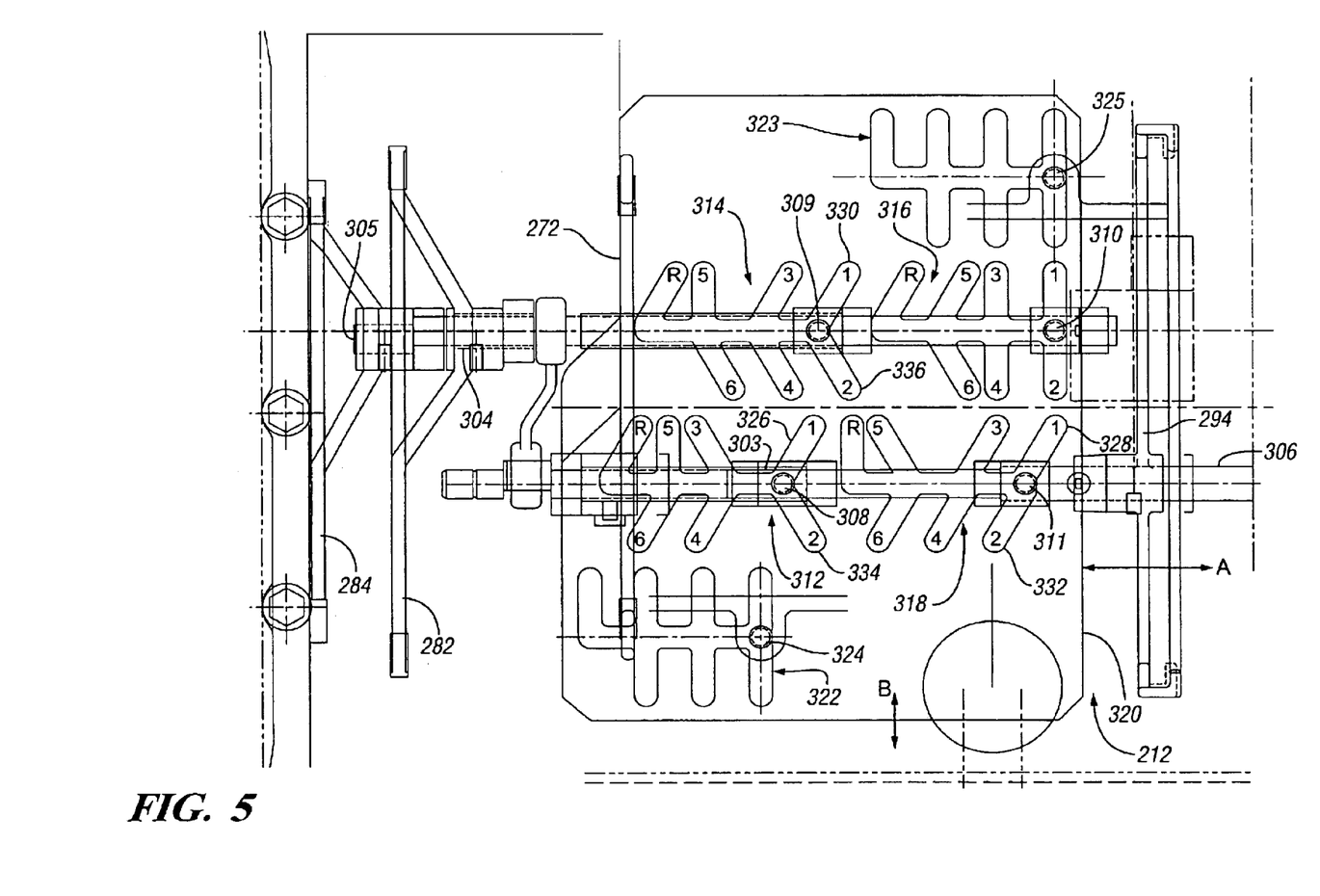
FIG. 5 is a top view of the planetary transmission shown in FIG. 4 describing the cam slots, which are disposed in a cylinder of infinite radius.

An alternative embodiment shown in FIGS. 4 and 5 include a power transmission 200 having an input shaft 202, a pair of planetary gearsets 204 and 206, an output shaft 208, and a transmission housing 210. The transmission 200 also includes a shift control mechanism 212. The shift control mechanism 212 includes a plurality of torque-transmitting synchronizers 214, 216, and 218.

The planetary gearset 204 includes a sun gear member 220, a ring gear member 222, and a planet carrier assembly member 224. The planet carrier assembly member 224 includes a plurality of pinion gears 226 rotatably mounted on a planet carrier member 228 and disposed in meshing relationship with both the sun gear member 220 and the ring gear member 222.

The planetary gearset 206 includes a sun gear member 230, a ring gear member 232, and a planet carrier assembly member 234. The planet carrier assembly member 234 includes a plurality of first pinion gears 236 meshing with the sun gear member 230 and a second plurality of pinion gears 238 meshing with the ring gear member 232. The pinion gears 236 and 238 are rotatably mounted on a planet carrier member 240.

The ring gear member 222 is connected through a hub 242 with the output shaft 208. The sun gear member 220 and planet carrier member 240 are continuously interconnected by a sleeve shaft 244.

The torque-transmitting synchronizer 214 includes an input member 245 that is continuously driven by the input shaft 202, a first shift collar 246 and a second shift collar 248. The first shift collar 246 is detented to the input member 245 through a conventional ball detent 250 and the shift collar 248 is detented to the input member 245 through a conventional ball detent 252. The shift collar 246 is movable rightward or aft in the transmission as seen in FIG. 4 to enforce engagement between the shift collar 246 and an output member 254. A conventional blocker ring and cone clutch assembly 256 is disposed between the shift collar 246 and the output member 254. The output member 254 is connected through a sleeve shaft 258 with the sun gear member 230.

The shift collar 248 is engageable with an output member 260, which is continuously connected with the ring gear member 232. A conventional blocker ring and cone clutch assembly 262 is disposed between the shift collar 248 and the output member 260. Thus, when the shift collar 246 is moved axially aftward in the transmission, or rightward as seen in FIG. 4, the input member 245 is drivingly connected with the sun gear member 230. When the shift collar 248 is moved aftward in the transmission, rightward as viewed in FIG. 4, the input shaft 202 is drivingly connected with the ring gear member 232.

The torque-transmitting synchronizer 216 includes a central portion 264, which is secured to a transmission housing 266. A shift collar 268 is slidably disposed on the central portion 264. The collar 268 is positioned in a neutral position by conventional ball detent assembly 270. The shift collar 268 is movable to the forward end of the transmission, or leftward, by a shift fork 272 such that the shift collar 268 passes through a conventional blocker ring and cone clutch assembly 274 to engage an output member 276. The output member 276 is drivingly connected with the sun gear member 220 and the planet carrier member 240. The shift collar 268 is movable aft or rightward as seen in FIG. 4, through a conventional blocker ring and cone clutch assembly 278 to engage an output member 280 that is drivingly connected with the ring gear member 222 and therefore output shaft 208. The shift collar 246 is controlled by a shift fork 282 and the shift collar 248 is controlled by a shift fork 284.

The torque-transmitting synchronizer 218 includes a central member 286 that is continuously drivingly connected with the ring gear member 232 through a hub 288. The torque-transmitting synchronizer 218 includes a shift collar 290, which is releasably held in a neutral position by a conventional ball detent 292. The shift collar 290 is controlled by a shift fork 294, which is operable to move the shift collar 290 forward, or leftward, through a conventional blocker ring and cone clutch assembly 296 to engage an output member 298, which is drivingly connected with the planet carrier member 228. The shift collar 290 is movable aft, or rightward, through a conventional blocker ring and cone clutch assembly 300 to engage an output member 302, which is continuously drivingly connected with the transmission output shaft 208.

As seen in FIG. 5, the shift forks 272, 282, 284, and 294 are connected with rods 303, 304, 305, and 306, respectively. The rod 303 has secured thereto a pin 308, the rod 304 has connected therewith a pin 309, the rod 305 has connected thereto a pin 310, and the rod 306 has connected thereto a pin 311. The pins 308, 309, 310, and 311 are disposed in respective cam tracks 312, 314, 316, and 318. These cam tracks 312, 314, 316, and 318 are formed in a plate 320, which is a component of the shift control 212. Also formed in the plate 320 are two neutral slots 322 and 323. Each of the neutral slots 322 and 323 has respective pins 324 and 325, which are grounded through the transmission case.

To establish movement of the shift forks 272, 282, 284, and 294, the plate 320 is moved fore and aft in the direction of Arrow A and transverse in the direction of Arrow B. This movement is accomplished by a conventional shift control mechanism, which might include a lever and a pair of push-pull cables. These devices are well known in the art of transmission controls. As the plate 320 is moved fore and aft in the direction of Arrow A, the pins 308, 309, 310, and 311 are held in neutral portions of their respective cam tracks. As the plate 320 is moved transversely in the direction of Arrow B, the pins 308, 309, 310, and 311 are either held in a neutral position by their respective cam tracks or displaced fore or aft by their respective cam tracks.

For example, in the position shown, if the plate 320 is moved downward as viewed in FIG. 5, the pin 308 will be moved aft by a track or slot 326 of cam track 312, the pin 311 will be moved aft by a track or slot 328 of cam track 318, the pin 309 will be moved aft by a track or slot 330 of the cam track 314, and the pin 310 will remain in a neutral condition in the cam track 316. If the plate 320 is moved upward in the direction of Arrow B, the pin 311 will be moved forward relative to the transmission by a track or slot 332, the pin 308 will be moved aft by a track or slot 334, the pin 309 will be moved aft by a track or slot 336. Again, pins 310 will remain in a neutral condition. The pins 324 and 325 always remain in a neutral condition and do not move either fore or aft relative to the transmission throughout the entire shift pattern. These pins 324 and 325 maintain the plate 320 in the desired orientation.

Those skilled in the art will recognize that as the plate 320 is moved in the direction of Arrow A, pins 308, 309, 310, and 311 will be aligned with various slots in their respective cam tracks and upon shifting the plate 320 transversely in the direction of Arrow B, their respective pins will be moved fore, aft, or remain neutral, which will result in, of course, the movement of the shift forks 272, 282, 284, and 294. The movement of the shift forks controls the engagement and disengagement of the torque-transmitting synchronizers 214, 216, and 218.

By manipulating the torque-transmitting synchronizers with the plate 320, the planetary gearsets 204 and 206 can be connected to provide six forward speed ratios and one reverse speed ratio between the input shaft 202 and the output shaft 208. The plate 320 is shown as a plate of infinite radius, that is, the plate is essentially flat. However, the plate can be designed with a finite radius such that the plate would encircle the entire planetary gearsets inside of the transmission housing. If a plate of finite radius, in other words a tube, is employed, the cam tracks 312, 314, 316, and 318 would be arranged in three sets of equiangular spacing about the plate of finite diameter. This would be similar to the structure shown in FIG. 1.

Figure 6:
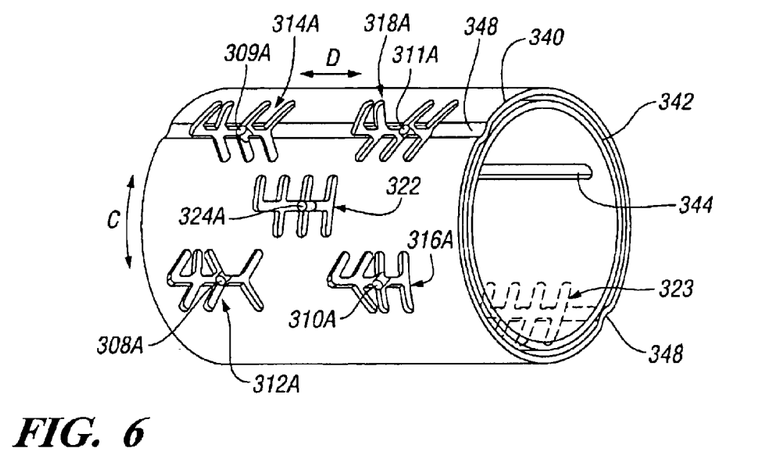
FIG. 6 is a diagrammatic representation of an alternative embodiment of a hub similar to that shown in FIG. 2.

FIG. 6 is a diagrammatic representation of such a structure. As can be seen, an outer tube 340 contains the cam tracks 312A, 314A, 316A and 318A. An inner tube 342 has axial tracks 344. The inner tube 342 is a stationary member similar to the tube 104 of FIG. 1. As the outer tube 340 is shifted axially (arrow D) and rotated (arrow C), the respective pin members for each of the synchronizer forks will be moved fore or aft, or remain in a neutral condition. When the tubular cam control mechanism shown in FIG. 6 is employed, each of the respective pins will be secured to a radial shift spoke as opposed to a shift fork, which is employed in the embodiment of FIG. 5. The intersection of the respective cam tracks on the outer tube 340 and the axial track 344 formed in the stationary tube will enforce pivoting of each of the spokes to manipulate the synchronizer shift collars to their desired positions.

Figure 7:
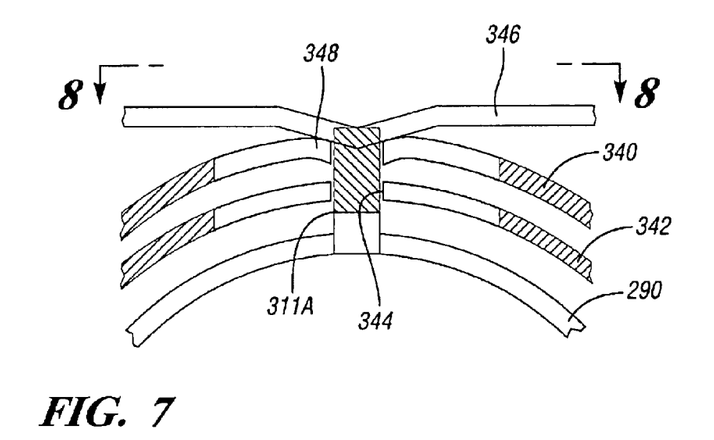
FIG. 7 is a partial end view FIG. 6.
Figure 8:
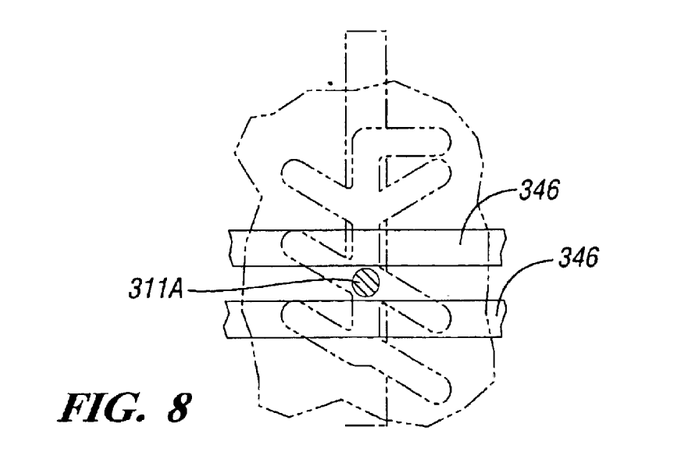
FIG. 8 is a view taken along line 8—8 in FIG. 7.

Leaf springs 346, shown in FIGS. 7 and 8, are located on each side of the shift actuator pin 311A and are attached to a stationary portion of the transmission. When outer tube 340 is in the neutral position, the springs 346 will drop into a groove 348 that is located at the neutral position of outer tube 340. These springs 346 automatically prevent the respective forks from moving off the neutral position until tube 340 has been rotated out of neutral, thus providing an interlock mechanism. Each of the pins 308A, 309A, 310A, and 324A are also positioned by spring members in a manner similar to pin 311A.

The manipulation of the control plate 320 and the outer tube 340 are similar. With the control plate 320 shown in FIG. 5, the transmission is conditioned for the first gear ratio when the plate 320 is moved downward. This conditions the shift fork 294 to the aft position, the shift fork 272 to the aft position, the shift fork 282 to the aft position, and the shift fork 284 remains in neutral. In the, first forward speed ratio, the input shaft 202 is connected with the sun gear member 230, the output shaft 208 is connected with the ring gear member 232, and the planet carrier member 228 is held stationary.

The plate 320 is moved back to the neutral position and then upward to the second ratio position from a one-to-two ratio interchange. During the interchange, of course, the clutch between the engine and the transmission is disengaged and then reengaged when the ratio interchange has been completed. In the second forward speed ratio, the shift fork 294 is moved forward, the shift fork 272 is moved aft, the shift fork 282 is moved aft, and the shift fork 284 remains in a neutral position. During the second forward speed ratio, the sun gear member 230 is connected with the input shaft 202, the ring gear member 232, and planet carrier member 228 are held stationary such that the second ratio is developed by both planetary gearsets.

The third forward speed ratio is established by moving the plate 320 back to the neutral position then moving the plate axially in the direction of Arrow A until the next set of cam tracks is aligned with their respective pin members. When this occurs, the plate 320 is moved downward in the direction of Arrow B such that the shift fork 294 is moved aft, the shift fork 272 is moved forward, the shift fork 282 is moved aft, and the shift fork 284 remains in the neutral condition.

The fourth forward speed ratio is established by moving the plate 320 upward until the neutral slot is engaged and then further moving the plate 320 upward to move the respective pins into the fourth ratio cam slot. During the fourth forward speed ratio, the shift fork 294 is moved forward, the shift fork 272 is moved forward, the shift fork 282 is moved aft, and the shift fork 284 remains neutral.

The fifth forward speed ratio is established by again moving the plate 320 to attain the neutral slot then moving the plate axially to align with the five-six cam slots and then moving the plate in the direction of Arrow B downward such that the respective pin members are manipulated by the fifth ratio cam slots. During the fifth forward speed ratio, the shift fork 294 is moved forward, the shift fork 272 is moved to the neutral position, the shift fork 282 is moved to the neutral position, and the shift fork 284 is moved aft.

The sixth forward speed ratio is established by moving the plate 320 back to the neutral position and then continuing movement so that the pins engage in their respective tracks. During the sixth forward speed ratio, the shift fork 294 is moved forward, the shift fork 272 is moved forward, the shift fork 282 is moved aft, and the shift fork 284 is moved aft.

The reverse speed ratio is established by manipulating the plate 320 to the maximum aft position and then moving the plate downward in the direction of Arrow B. During the reverse speed ratio, the shift fork 294 is in the neutral position, the shift fork 272 is moved aft, the shift fork 282 is moved aft, and the shift fork 284 is moved aft. When a system employing the tubes 340 and 342 is employed, the tube 340 is moved linearly in the direction of Arrow D, along the neutral path and then rotated in the direction of Arrow C to engage the proper gear ratio.

Those skilled in the art can readily determine the power paths through the planetary gearsets when each of these ratios is completed.

What is claimed is:

1. A synchronizer control apparatus for a power transmission having a plurality of planetary gearsets, said synchronizer control apparatus comprising:
   a plurality of torque-transmitting synchronizer mechanisms movable to engaged and disengaged positions;
   each torque-transmitting synchronizer having a shiftable collar means, at least one axially movable control rod means engaging each of said shiftable collar means;
   control means including at least one cam control slot means for each of said control rod means; and
   said control means being movable to cause said cam control slots to enforce axial movement of said control rod means to control engagement and disengagement of said torque-transmitting synchronizer mechanisms, said control means including a moveable tubular member surrounding at least a portion of said power transmission and having at least three cam control slot means.

2. The synchronizer control apparatus for a power transmission having a plurality of planetary gearsets, said synchronizer control apparatus defined in claim 1 further comprising:
   said tubular member having a finite diameter.

3. The synchronizer control apparatus for a power transmission having a plurality of planetary gearsets, said synchronizer control apparatus defined in claim 1 further comprising:
   said tubular member having an infinite radius.

4. The synchronizer control apparatus for a power transmission having a plurality of planetary gearsets, said synchronizer control apparatus defined in claim 1 further comprising:
   each of said cam slot means having a cam track for each of said torque transmitting mechanisms and also including at least one neutral track.

5. The synchronizer control apparatus for a power transmission having a plurality of planetary gearsets, said synchronizer control apparatus defined in claim 1 further comprising:
   said control means further including a stationary tubular member disposed radially inward of said moveable tubular member and having formed therein at least one neutral cam track.

6. The synchronizer control apparatus for a power transmission having a plurality of planetary gearsets, said synchronizer control apparatus defined in claim 1 further comprising:
   said control means further including a stationary tubular member of finite diameter disposed radially inward of said moveable tubular member and having formed therein at least one neutral cam track;
   said moveable tubular members each having a finite diameter;
   said control rod means being disposed in said cam slot means formed in said moveable tubular member and being retained in a neutral slot of each of said cam control slots by a leaf spring member when said moveable tube is in a neutral position.

7. The synchronizer control apparatus for a power transmission having a plurality of planetary gearsets, said synchronizer control apparatus defined in claim 6 further comprising:
   said leaf spring members abutting an outer periphery of said moveable tube and being urged radially outward by said periphery when said moveable tube is rotated from a neutral position to a ratio position to permit movement of said rod means.

* * * * *